(12) United States Patent
Chen et al.

(10) Patent No.: US 6,587,589 B1
(45) Date of Patent: Jul. 1, 2003

(54) ARCHITECTURE FOR PERFORMING TWO-DIMENSIONAL DISCRETE WAVELET TRANSFORM

(75) Inventors: Liang-Gee Chen, Shindian (TW); Po-Cheng Wu, Tainan (TW); Yuan-Chen Liu, Taipei (TW); Yeong-Kang Lai, Shindian (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/514,522

(22) Filed: Feb. 28, 2000

(51) Int. Cl.[7] .................................................. G06K 9/46
(52) U.S. Cl. ........................ 382/240; 382/232; 382/248
(58) Field of Search ................................. 382/240, 305, 382/248, 232; 375/240.11; 708/400, 319

(56) References Cited

U.S. PATENT DOCUMENTS

| | | | | |
|---|---|---|---|---|
| 5,745,392 A | * | 4/1998 | Ergas et al. | 364/715.02 |
| 5,889,559 A | * | 3/1999 | Yang | 375/240.11 |
| 5,907,360 A | * | 5/1999 | Kessler et al. | 348/398 |
| 5,999,656 A | * | 12/1999 | Zandi et al. | 382/248 |
| 6,041,147 A | * | 3/2000 | Mead | 382/305 |

FOREIGN PATENT DOCUMENTS

JP      2002197075 A  *  7/2002  ............ G06F/17/14

OTHER PUBLICATIONS

Chang et al., "A Simple Parallel Architecture for Discrete Wavelet Transform", IEEE, vol. 3, Jun. 1997, pp. 2100–2103.*

* cited by examiner

Primary Examiner—Anh Hong Do
(74) Attorney, Agent, or Firm—Michael Best & Friedrich LLC

(57) ABSTRACT

An architecture for performing the two-dimensional discrete wavelet transform includes a transform module including a first stage and a second stage for decomposing an input image into four bands, and among the four bands, the band having the low frequency in both horizontal and vertical direction serves as the input image for next level decomposition operation; a multiplexer for selecting the band having the low frequency in both horizontal and vertical direction as the input image to feed into the transform module; and an optional memory module for storing the band having the lowest frequency in both horizontal and vertical direction. The polyphse decomposition technique is employed to the decimation filters of the first stage for segmenting the coefficients of the decimation filters of the first stage into an odd-numbered part and an even-numbered part, and the coefficient folding technique is employed to the decimation filters of the second stage such that every two coefficients of the decimation filters of the second stage share one set of a multiplier, an adder, and a register.

7 Claims, 15 Drawing Sheets

US 6,587,589 B1

ARCHITECTURE FOR PERFORMING TWO-DIMENSIONAL DISCRETE WAVELET TRANSFORM

FIELD OF THE INVENTION

The present invention is generally related to two-dimensional discrete wavelet transform (2-D DWT), and more particularly to an architecture for performing the two-dimensional discrete wavelet transform.

BACKGROUND OF THE INVENTION

Recently, a wide variety of microprocessors aimed on having the capabilities for simultaneously processing audio signals and video images are brought out due to the mushroom development in the very-large-scaled integration (VLSI) circuit. The technique of the two-dimensional discrete wavelet transform (2-D DWT) is the crux of the image compression standard of new generation, such as JPEG-2000 still image compression standard. Thus, the technique of the two-dimensional discrete wavelet transform will play a decisive role in the image compression/decompression system. Nowadays the research of the two-dimensional discrete wavelet transform in many applications such as audio signal processing, computer graphics, numerical analysis, radar target identification, is in progress. In general, the basic architecture of the two-dimensional discrete wavelet transform is composed of multirate filters. Because the quantity of processing data in practical applications, e.g. digital camera, is extraordinarily enormous, it is desirable to develop a high-efficient, low-cost architecture for performing the two-dimensional discrete wavelet transform.

The mathematical formulas of the 2-D DWT using the separable FIR filters for implementation are represented in the following equations:

$$x_{LL}^J(n_1, n_2) = \sum_{i_1=0}^{K-1}\sum_{i_2=0}^{K-1} g(i_1) \cdot g(i_2) \cdot x_{LL}^{J-1}(2n_1 - i_1)(2n_2 - i_2) \quad (1)$$

$$x_{LH}^J(n_1, n_2) = \sum_{i_1=0}^{K-1}\sum_{i_2=0}^{K-1} g(i_1) \cdot h(i_2) \cdot x_{LL}^{J-1}(2n_1 - i_1)(2n_2 - i_2) \quad (2)$$

$$x_{HL}^J(n_1, n_2) = \sum_{i_1=0}^{K-1}\sum_{i_2=0}^{K-1} h(i_1) \cdot g(i_2) \cdot x_{LL}^{J-1}(2n_1 - i_1)(2n_2 - i_2) \quad (3)$$

$$x_{HH}^J(n_1, n_2) = \sum_{i_1=0}^{K-1}\sum_{i_2=0}^{K-1} h(i_1) \cdot h(i_2) \cdot x_{LL}^{J-1}(2n_1 - i_1)(2n_2 - i_2) \quad (4)$$

where the J is the number of decomposition level, k is the filter length, g(n) and h(n) are the impulse response of the low pass filter G(z) and high pass filter H(z) respectively. $x_{LL}^0(n1, n2)$ represents the input image.

Please refer to FIG. 1 which illustrates a three-level architecture for performing the two-dimensional discrete wavelet transform. Each decomposition level includes two stages, wherein the firs stage performs the horizontal filtering operation and the second stage performs the vertical filter operation. In the first level decomposition, the size of the input image is N×N, the outputs are three decomposed subbands LH, HL, and HH all having a size of N/2×N/2. In the second level decomposition, the input is the LL band, the outputs are three decomposed subbands LLLH, LLHL, and LLHH all having a size of N/4×N/4. In the third level decomposition, the input image is the LLLL band, and the outputs are four decomposed subbands $(LL)^2LL$, $(LL)^2LH$, $(LL)^2HL$, and $(LL)^2HH$ all having a size of N/8×N/8. The result of decomposition operation for level above three can be deduced by analogy.

Among the present architectures for performing the two-dimensional discrete wavelet transform, the most common and well-known architecture is the parallel filter architecture. The design of the parallel filter architecture is based on the modified recursive pyramid algorithm (MRPA) to dispersively interpolate the computations of the second and the subsequent levels in the computation of the first level. In the beginning, the MRPA is applied to the one-dimensional discrete wavelet transform (1-D DWT). The quantity of processing data in each level is half of that in the previous level due to decimation operation, and thus the total quantity of processing data is:

$$\sum_{L=1}^{J} \frac{N}{2^{L-1}} = N + \frac{N}{2} + \frac{N}{2^2} + \frac{N}{2^3} + \ldots + \frac{N}{2^{J-1}} = 2(1 - 2^{-J})N \quad (5)$$

where J is the number of level, N is the quantity of the processing data in the first level, N/2 is the quantity of processing data in the second level, . . . and $N/2^{J-1}$ is the quantity of processing data in the $J^{th}$ level. When the number of the level J is large enough, Eq. (5) can be simplified to Eq. (6):

$$2(1-2^{-J})N \approx 2N = N+N \quad (6)$$

Because the quantity of processing data in the first level is identical to that in the second and the subsequent levels, the computing time of the first level can be filled up as shown in FIG. 2. In the mean time, the hardware will be fully utilized, and thus the MRPA is suitable for the one-dimensional discrete wavelet transform.

Nonetheless, we found that the MRPA is not suitable for the two-dimensional discrete wavelet transform. Please refer to FIG. 3 showing the two-dimensional discrete wavelet transform employing modified recursive pyramid algorithm (MRPA). Because the quantity of processing data in each level is one-fourth of that in the previous level, the total quantity of the processing data is:

$$\sum_{L=1}^{J} \frac{N^2}{4^{L-1}} = N^2 + \frac{N^2}{4} + \frac{N^2}{4^2} + \frac{N^2}{4^3} + \ldots + \frac{N^2}{4^{J-1}} = \frac{4}{3}(1 - 4^{-J})N^2 \quad (7)$$

where J is the number of level, $N^2$ is the quantity of processing data in the first level, $N^2/4$ is the quantity of processing data in the second level, . . . , and $N^2/4^{J-1}$ is the quantity of processing data in the $J^{th}$ level. When the number of level J is large enough, Eq. (7) can be simplified to Eq. (8):

$$\frac{4}{3}(1 - 4^{-J})N^2 \approx \frac{4}{3}N^2 = N^2 + \frac{1}{3}N^2 \quad (8)$$

Because the quantity of processing data in the second and the subsequent levels ($N^2/3$) is one-third of that in the first level ($N^2$) the computing time of the first decomposition level will not be filled up and then the hardware will enter into idle state. That renders the hardware utilization low, and it requires a complex control circuit to process the interleading data flow among the levels.

Please refer to FIG. 4 which is a schematic diagram illustrating the parallel filter architecture. The parallel filter architecture includes four filters: Hor1, Hor2, Ver1, and Ver2. The transpose memories Storage1 and Storage 2 are used to perform transpose operation. The Hor1 performs horizontal filtering operation of the first level, Hor2 performs the horizontal filtering operation of the second and the subsequent levels, and Ver1 and Ver2 performs the overall vertical filtering operation.

Please refer to FIG. 5 which illustrates the operating configuration of the architecture of FIG. 4. The individual hardware utilization of the four filters and average hardware utilization can be evaluated as the following equations, where J is the number of level:

$$\text{Hor1: } 1 \tag{9}$$

$$\text{Ver1: } \sum_{L=1}^{J} \frac{1}{2 \cdot 4^{L-1}} = \frac{1}{2} + \frac{1}{8} + \frac{1}{32} + \ldots + \frac{1}{2 \cdot 4^{J-1}} = \frac{2}{3}(1 - 4^{-J}) \tag{10}$$

$$\text{Ver2: } \sum_{L=1}^{J} \frac{1}{2 \cdot 4^{L-1}} = \frac{1}{2} + \frac{1}{8} + \frac{1}{32} + \ldots + \frac{1}{2 \cdot 4^{J-1}} = \frac{2}{3}(1 - 4^{-J}) \tag{11}$$

$$\text{Hor2: } \sum_{L=2}^{J} \frac{1}{4^{L-1}} = 0 + \frac{1}{4} + \frac{1}{16} + \frac{1}{64} + \ldots + \frac{1}{4^{J-1}} = \frac{1}{3}(1 - 4^{-(J-1)}) \tag{12}$$

$$\text{Average: } \frac{1}{4}(\text{Hor1} + \text{Ver1} + \text{Ver2} + \text{Hor2}) = \frac{2}{3}(1 - 4^{-J}) \tag{13}$$

Table 1 lists the hardware utilization of the parallel filter architecture in different level:

TABLE 1

| 2-D DWT | Hardware Utilization | | | | |
|---|---|---|---|---|---|
| Level | Hor 1 | Ver 1 | Ver 2 | Hor 2 | Average |
| 1 | 1 = 100% | 1/2 = 50% | 1/2 = 50% | 0 | 50% |
| 2 | 1 = 100% | 5/8 = 62.5% | 5/8 = 62.5% | 1/4 = 25% | 62.5% |
| 3 | 1 = 100% | 21/32 = 65.63% | 21/32 = 65.63% | 5/16 = 31.25% | 65.63% |
| 4 | 1 = 100% | 85/128 = 66.41% | 85/128 = 66.41% | 21/64 = 32.81% | 66.41% |
| 5 | 1 = 100% | 341/512 = 66.60% | 341/512 = 66.60% | 85/256 = 33.20% | 66.60% |
| 6 | 1 = 100% | 1365/2048 = 66.65% | 1365/2048 = 66.65% | 341/1024 = 33.30% | 66.65% |
| 7 | 1 = 100% | 5461/8192 = 66.66% | 5461/8192 = 66.66% | 1365/4096 = 33.33% | 66.66% |
| 8 | 1 = 100% | 21845/32768 = 66.67% | 21845/32768 = 66.67% | 5461/16384 = 33.33% | 66.67% |

It can be known from Table 1 that the hardware utilization of the first level of the parallel filter architecture is simply 50%. The hardware utilization will be converged to 66.67% with the increase of the level. That indicates that its hardware utilization is low.

In conclusion, though the MRPA is suitable for the one-dimensional discrete wavelet transform (1-D DWT), it is not suitable for the two-dimensional discrete wavelet transform (2-D DWT). The drawbacks of the parallel filter architecture are the irregular data flow, low hardware utilization, long computing time, and high control complexity. Therefore, it is necessary to develop an architecture for performing the 2-D DWT with a 100% hardware utilization, short computing time, regular data flow, low control complexity, and can be used to perform unlimited level decomposition operation without being limited by coefficients of the filter.

SUMMARY OF THE INVENTION

The primary object of the present invention is to provide an architecture for performing two-dimensional discrete wavelet transform with a 100% hardware utilization, short computing time, regular data flow, low control complexity, and can be used to perform unlimited level decomposition operation without being limited by coefficients of the filter.

According to the present invention, the architecture adapted to perform the two-dimensional discrete wavelet transform for performing multilevel decomposition operation to decompose an original image into a plurality of bands includes: a transform module for decomposing an input image into four bands, wherein among the four bands, the band having the low frequency in both horizontal and vertical direction serves as the input image for next level decomposition operation; and a multiplexer for selecting the band having the lowest frequency in both horizontal and vertical direction as the input image to feed into the transform module.

In accordance with the present invention, the architecture further includes a memory module for storing the band having the low frequency in both horizontal and vertical direction.

In accordance with the present invention, the storage size of the memory module is one-fourth of the size of the original image.

In accordance with the present invention, the transform module further includes a first stage consisting of decimation filters for performing the horizontal filtering operation and a second stage consisting of decimation filters for performing the vertical filtering operation.

In accordance with the present invention, the polyphase decomposition technique is employed to the decimation filters of the first stage for segmenting the coefficients of the decimation filters of the first stage into an odd-numbered part and an even-numbered part.

In accordance with the present invention, the coefficient folding technique is employed to the decimation filters of the second stage such that every two coefficients of the decimation filters of the second stage share one set of a multiplier, an adder, and a register.

In accordance with the present invention, the register of the decimation filter of the second stage is a row register including: multiple register blocks, wherein the number of said register blocks is the number of decomposition level of the architecture; multiple one-by-two demultiplexer, each of which is electrically connected between two register blocks for receiving the output of the previous register block as an input, wherein one output of each one of one-by-two demultiplexer serves as the input for next register block and the other output of each one of one-by-two demultiplexer serves as a part of the output of the row register; and multiple select signal lines, each of which is electrically connected to one corresponding one-by-two demultiplexer for selecting the output of the corresponding one-by-two demultiplexer.

In accordance with another aspect of the present invention, an architecture adapted to perform the two-dimensional discrete wavelet transform for performing a single level decomposition operation to decompose an original image into four bands includes: a transform module for decomposing the original image into four bands.

In accordance with another aspect of the present invention, the transform module further includes a first stage consisting of decimation filters for performing the horizontal filtering operation and a second stage consisting of decimation filters for performing the vertical filtering operation.

In accordance with another aspect of the present invention, the polyphase decomposition technique is employed to the decimation filters of the first stage for segmenting the coefficients of the decimation filters of the first stage into an odd-numbered part and an even-numbered part.

In accordance with another aspect of the present invention, the coefficient folding technique is employed to the decimation filters of the second stage such that every two coefficients of the decimation filters of the second stage share one set of a multiplier, an adder, and a register.

Now the foregoing and other features and advantages of the present invention will be more clearly understood through the following descriptions with reference to the accompanying drawings, in which:

DETAILED DESCRIPTION OF THE PREFERRED EMBODIMENTS

Figure 1:
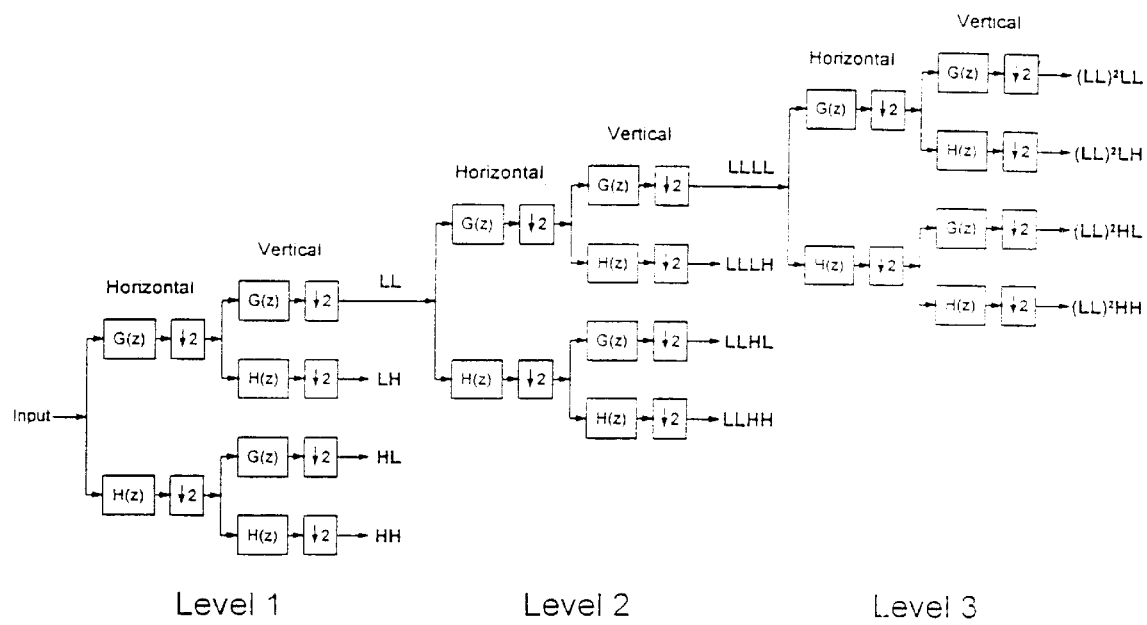
FIG. 1 is a schematic diagram illustrating a three-level architecture for performing the two-dimensional discrete wavelet transform.
Figure 2:
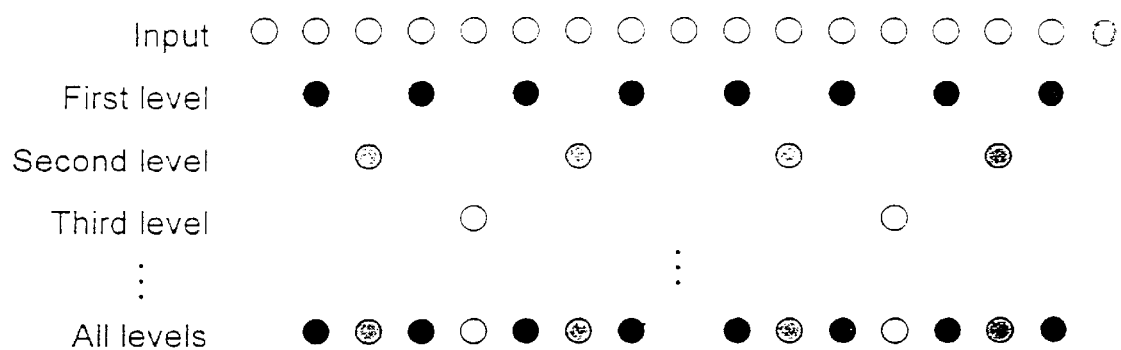
FIG. 2 is a schematic diagram showing the one-dimensional discrete wavelet transform employing modified recursive pyramid algorithm (MRPA) according to the prior art.
Figure 3:
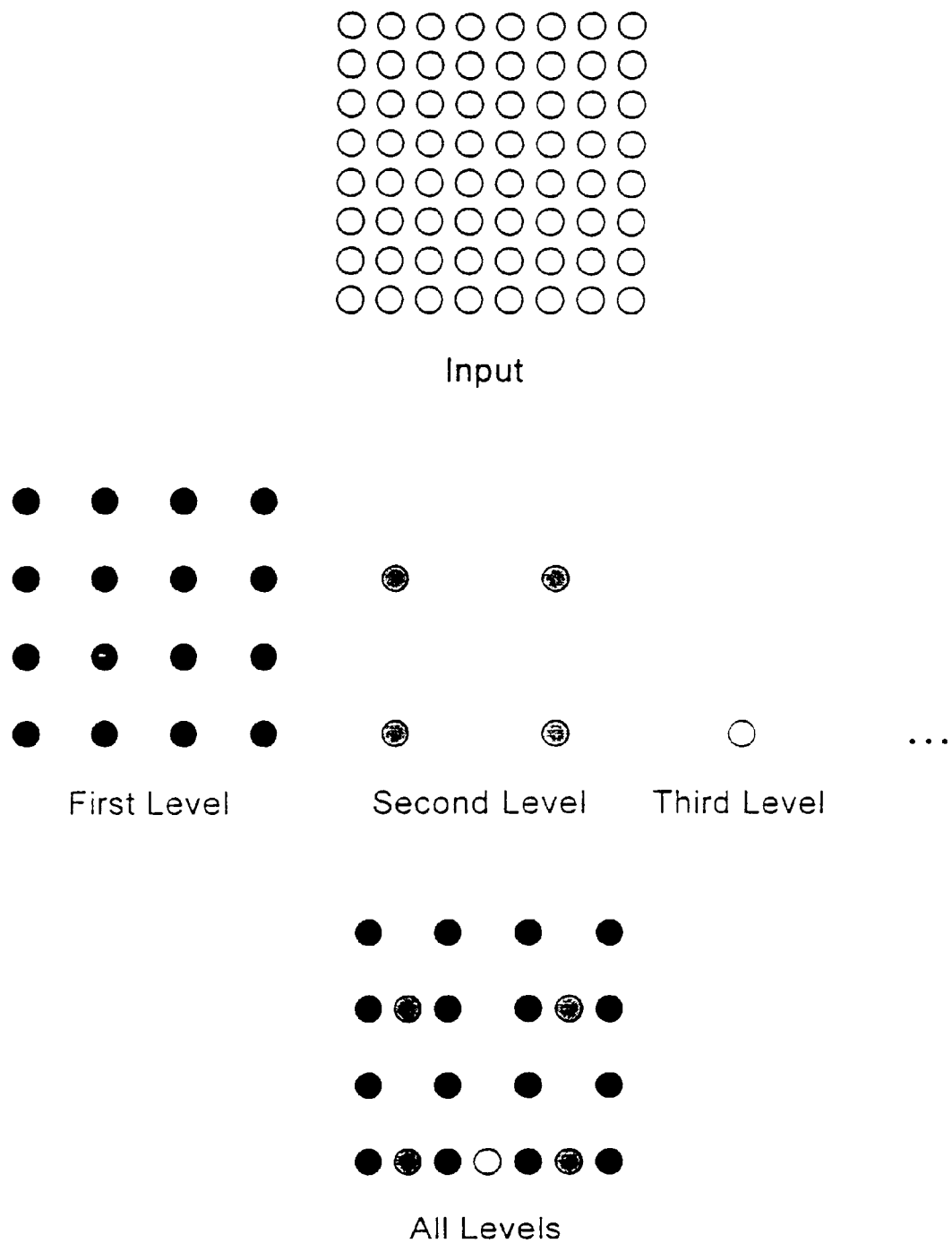
FIG. 3 is a schematic diagram showing the two-dimensional discrete wavelet transform employing modified recursive pyramid algorithm (MRPA) according to the prior art.
Figure 4:
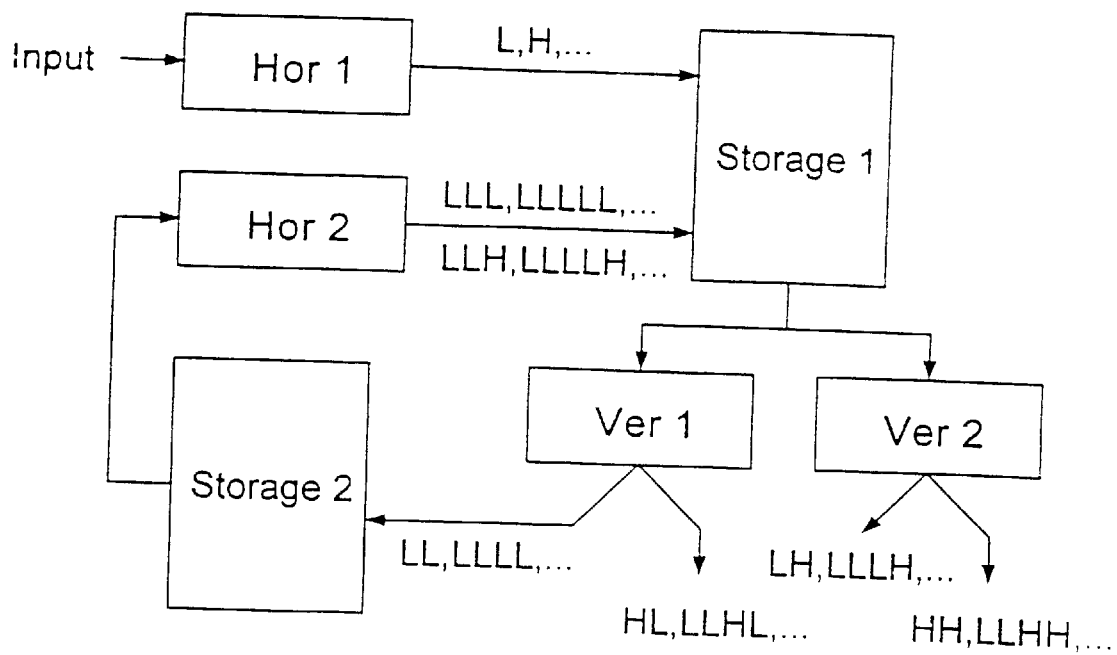
FIG. 4 is a schematic diagram showing the conventional parallel filter architecture for performing the two-dimensional discrete wavelet transform.
Figure 5:
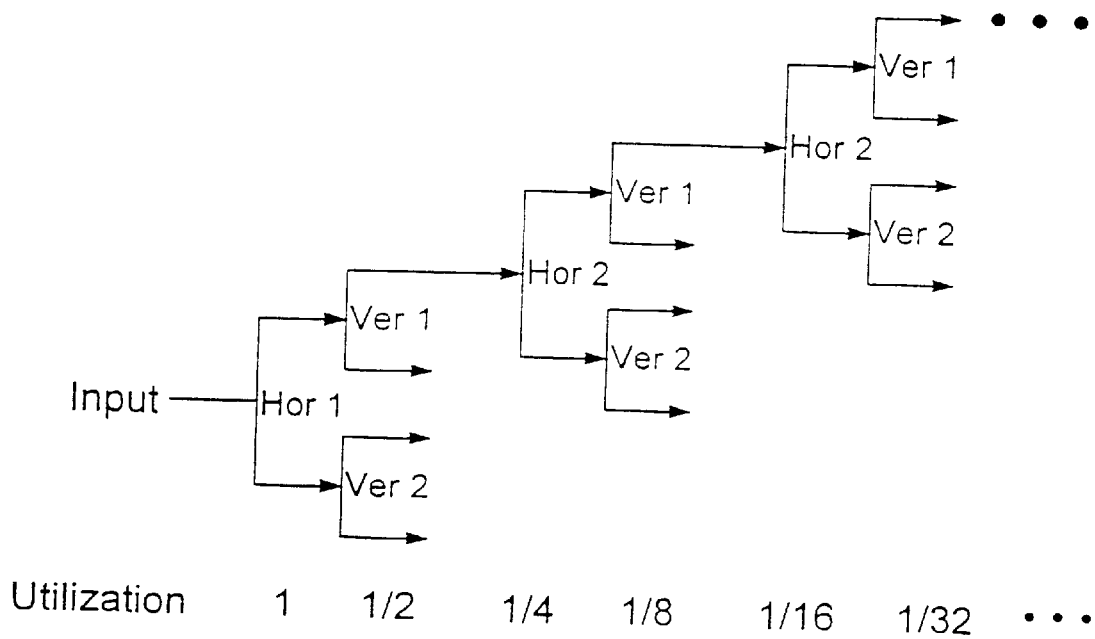
FIG. 5 is a schematic diagram showing the operating configuration of the architecture of FIG. 4.
Figure 6:
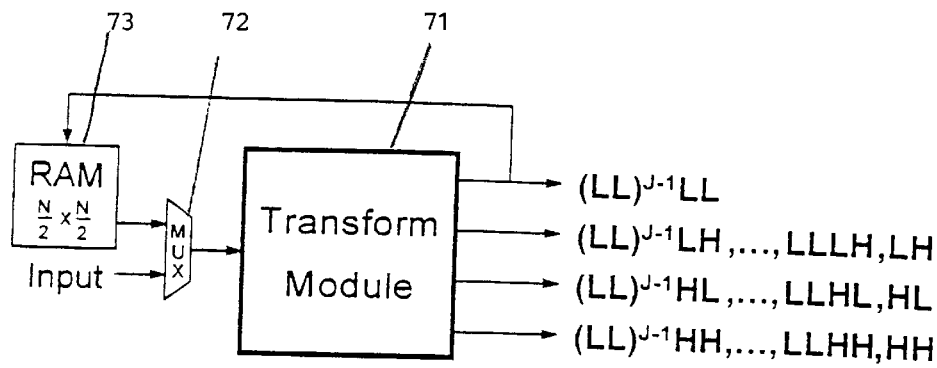
FIG. 6 is a schematic diagram showing the architecture for performing the two-dimensional discrete wavelet transform according to the present invention.

Please refer to FIG. 6 showing the architecture for performing the two-dimensional discrete wavelet transform according to the present invention. The architecture for performing the two-dimensional discrete wavelet transform according to the present invention includes a transfer module 71, a multiplexer 72, and an optional memory module 73. The size of the memory module is N/2×N/2. In the first level, the multiplexer 72 selects an original image and inputs the original image into the transform module 71. The transform module 71 decomposes the original image into four subbands of LL, LH, HL, HH, and store the LL band back into the memory module 73. After finishing the decomposition operation of the first level, the multiplexer 72 selects image from the memory module 73 and inputs the LL band into the transform module 71 for performing the decomposition operation of the second level. Thereafter, the transform module 71 will decomposes the LL band into four subbands of LLLL, LLLH, LLHL, LLHH, and store the LLLL band back into the memory module 73. After finishing the decomposition operation of the second level, the multiplexer 72 selects image from the memory module 73 again and inputs the LLLL band into the transform module 71 for performing the third level decomposition operation. The transform module 71 will then decomposes the LLLL band into four subbands of $(LL)^2LL$, $(LL)^2LH$, $(LL)^2HL$, $(LL)^2HH$, and store the $(LL)^2LL$ band back into the RAM module 73. The decomposition operation can be repeated in above manner until accomplishing the decomposition operation of the desired $J^{th}$ level. If the transform module 71 is designed to perform a single level decomposition, i.e., the decomposition operation will be performed once, the memory module 73 and the multiplexer 72 will no longer be needed, and the outputs will substantially be four bands of LL, LH, HL, and HH.

Figure 7:
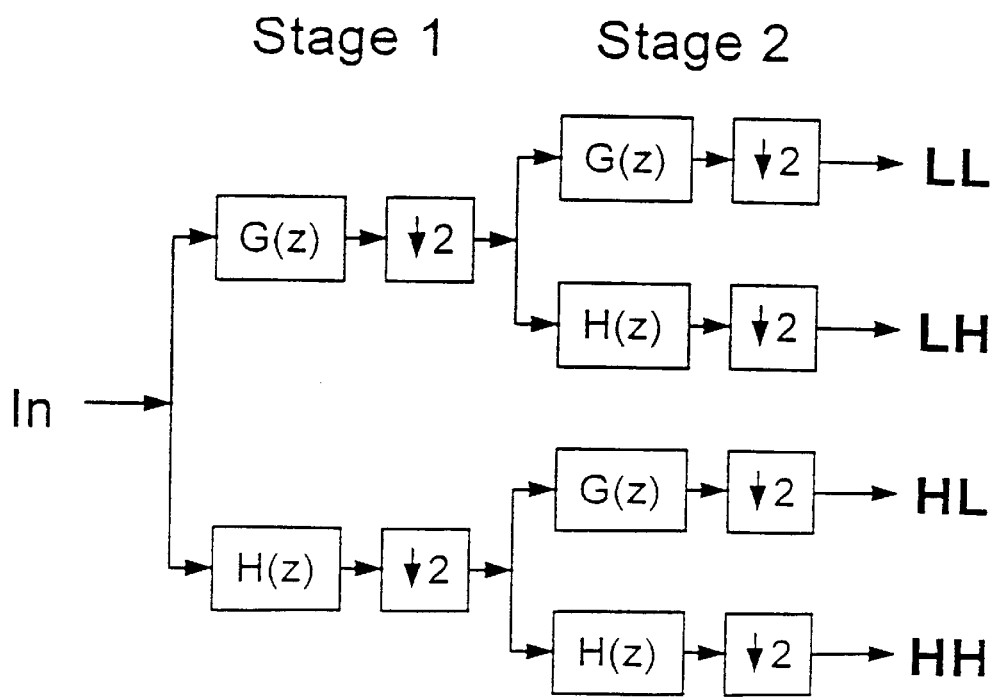
FIG. 7 is a schematic diagram showing the tree-structured transform module of the architecture for performing the two-dimensional discrete wavelet transform.

Such an implementation has an advantage of the regular data flow. Accordingly, the development of the architecture for performing the 2-D DWT according to the present invention can be concentrated on the design of the transform module 71. Please refer to FIG. 7 which is a tree-structured transform module of the architecture for performing the two-dimensional discrete wavelet transform. The first stage performs the horizontal filtering operation and the second stage performs the vertical filtering operation. In order to design the transform module in a more efficient way, assuming that the required hardware area of the first stage is a and the computing time is t. It can be seen from FIG. 7 that the number of the filters in the second stage will be twice of that in the first stage. That is, the required hardware area of the second stage will be 2a. On the other hand, because the first stage will perform decimation operation, the quantity of processing data for each filter of the second stage will be half of that of the first stage. That indicates the computing time of the second stage will be t/2. However, because the operation of the second stage have to be suspended to await the accomplishment of the operation of the first stage, a hardware idleness of 2a×(t−t/2)=at will occur to the second stage. That means the original design of the transform module is inefficient.

Figure 8:
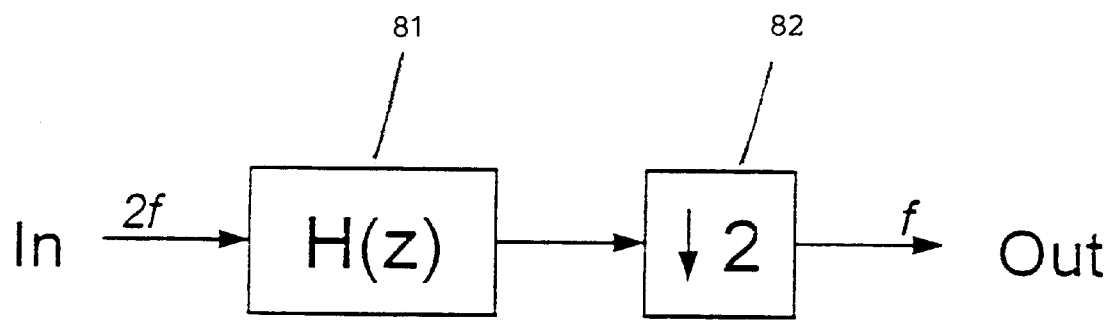
FIG. 8 is a schematic view showing a single decimation filter consisting of a filter followed by a two-folded decimator.
Figure 9:
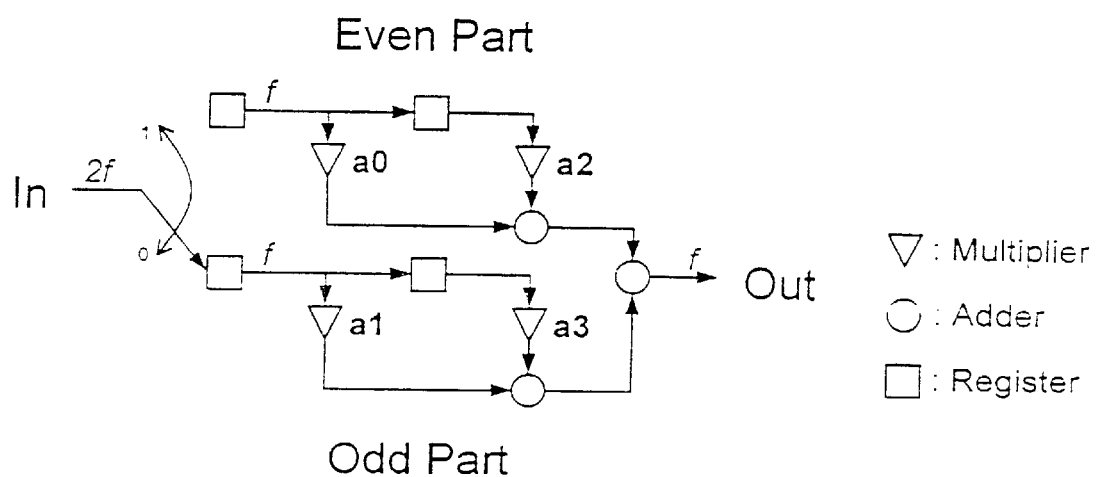
FIG. 9 is a schematic diagram illustrating the structure of the decimation filter after employing the polyphase decomposition technique according to the present invention.

In order to cope with this problem, consider a single decimation filter first. Please refer to FIG. 8 showing a single decimation filter consisting of a filter 81 followed by a two-folded decimator 82. One of the two outputs of the decimation filter will be discarded due to the decimation operation of the decimator 82. That results in a great hardware waste of the decimation filter. Consequently, we employs two different techniques to enhance the hardware performance. The first one is the polyphase decomposition technique. Referring to FIG. 9, the coefficients of the decimation filter are segmented into the odd-numbered part and the even-numbered part. In even clock cycle, the input data enters the odd-numbered part and be multiplied by an odd-numbered coefficient. In odd clock cycle, the input data enters the even-numbered part and be multiplied by an even-numbered coefficient. The output is then the sum of the product of the odd-numbered part and the product of the even-numbered part. Having employed the polyphase decomposition technique, the input clock rate can be doubled and thus the throughput will be increased because the internal clock rate is half of the input clock rate. Therefore, the computing time will be reduced from t to t/2 based on the same quantity of processing data. Table 2 lists the timing-data flow relationship of the decimation filter employing the polyphase decomposition technique.

TABLE 2

| Clk | SW* | In | Odd Part | Even Part | Out |
|---|---|---|---|---|---|
| 0 | 0 | x(0) | $a_1x(0)$ | | |
| 1 | 1 | x(1) | | $a_0x(1)$ | $a_0x(1) + a_1x(0)$ |
| 2 | 0 | x(2) | $a_1x(2) + a_3x(0)$ | | |
| 3 | 1 | x(3) | | $a_0x(3) + a_2x(1)$ | $a_0x(3) + a_1x(2) + a_2x(1) + a_3x(0)$ |
| 4 | 0 | x(4) | $a_1x(4) + a_3x(2)$ | | |
| 5 | 1 | x(5) | | $a_0x(5) + a_2x(3)$ | $a_0x(5) + a_1x(4) + a_2x(3) + a_3x(2)$ |
| 6 | 0 | x(6) | $a_1x(6) + a_3x(4)$ | | |
| 7 | 1 | x(7) | | $a_0x(7) + a_2x(5)$ | $a_0x(7) + a_1x(6) + a_2x(5) + a_3x(4)$ |
| 8 | 0 | x(8) | $a_1x(8) + a_3x(6)$ | | |
| 9 | 1 | x(9) | | $a_0x(9) + a_2x(7)$ | $a_0x(9) + a_1x(8) + a_2x(7) + a_3x(6)$ |

*SW indicates the directions of the switch.

The second technique employed in the design of the decimation filter is the coefficient folding technique. Please refer to FIG. 10. Every two coefficients share one set of a multiplier, an adder, and a register. The switch is used to control the path of the data flow. In the beginning, consider the PE0 part first. In the zero clock cycle, the input data x(0) is multiplied with the coefficient a1 and the product is further added with the content of the register R1 (the content of R1 is 0 initially). Thereafter, the result of a1x(0) is stored in the register R0. In the first clock cycle, the input data x(1) is multiplied with the coefficient a0 and the product is further added with the content of the register R0 which is a1x(0). The result will be a0x(1)+a1x(0) and then be outputted. In the second clock cycle, the input data x(1) is multiplied with the coefficient a1 and the product is further added with the content of the register R1 which is a2x(1)+a3x(0). The result of a1x(2)+a2x(1)+a3x(0) is stored in the register R0. In the third clock cycle, the input data x(3) is multiplied with the coefficient a0 and the product is further added with the content of the register R0 which is a1x(2)+a2x(1)+a3x(0). The result will be a0x(3)+a1x(2)+a2x(1)+a3x(0) and then be outputted. The operation of subsequent clock cycles can be deduced by analogy. Moreover, the operating manner of PE1 is analogous to PE0. Because every two coefficients share one set of a multiplier, an adder, and a register, this technique can be employed to reduce the required hardware area from a to a/2. Table 3 lists the timing-data flow relationship of the decimation filter employing the coefficient folding technique.

TABLE 3

| Clk | SW* | In | PE 1 | PE 0 | Out |
|---|---|---|---|---|---|
| 0 | 0 | x(0) | $a_3x(0)$ | $a_1x(0)$ | |
| 1 | 1 | x(1) | $a_2x(1) + a_3x(0)$ | $a_0x(1) + a_1x(0)$ | $a_0x(1) + a_1x(0)$ |
| 2 | 0 | x(2) | $a_3x(2)$ | $a_1x(2) + a_2x(1) + a_3x(0)$ | |
| 3 | 1 | x(3) | $a_2x(3) + a_3x(2)$ | $a_0x(3) + a_1x(2) + a_2x(1) + a_3x(0)$ | $a_0x(3) + a_1x(2) + a_2x(1) + a_3x(0)$ |
| 4 | 0 | x(4) | $a_3x(4)$ | $a_1x(4) + a_2x(3) + a_3x(2)$ | |
| 5 | 1 | x(5) | $a_2x(5) + a_3x(4)$ | $a_0x(5) + a_1x(4) + a_2x(3) + a_3x(2)$ | $a_0x(5) + a_1x(4) + a_2x(3) + a_3x(2)$ |
| 6 | 0 | x(6) | $a_3x(6)$ | $a_1x(6) + a_2x(5) + a_3x(4)$ | |
| 7 | 1 | x(7) | $a_2x(7) + a_3x(6)$ | $a_0x(7) + a_1x(6) + a_2x(5) + a_3x(4)$ | $a_0x(7) + a_1x(6) + a_2x(5) + a_3x(4)$ |
| 8 | 0 | x(8) | $a_3x(8)$ | $a_1x(8) + a_2x(7) + a_3x(6)$ | |
| 9 | 1 | x(9) | $a_2x(9) + a_3x(8)$ | $a_0x(9) + a_1x(8) + a_2x(7) + a_3x(6)$ | $a_0x(9) + a_1x(8) + a_2x(7) + a_3x(6)$ |

*SW indicates the directions of the switch.

Subsequently, we employ the two techniques to the design of first stage and the second stage. Therefore, four different design combinations can be derived as shown in Table 4. It can be found that if the polyphase decomposition technique is employed to the first stage while the coefficient folding technique is employed to the second stage, the hardware area and the computing time of both the first stage and the second stage will be a and t/2 respectively. In the mean time, the total hardware area will be 2a and the total computing time will be t/2. The AT product will be reduced from 3at to at and none of the filters will enter into the idle state. That indicates the overall performance of the transform module according to the present invention will thrice as that of the original transform module. Adversely, the other design combinations listed in Table 4 will inevitably cause the filters of the second stage to enter into idle state and thus they are not efficient design strategy.

TABLE 4

| Methods | | | | | | | | |
|---|---|---|---|---|---|---|---|---|
| Stage 1 | Stage 2 | Stage 1 | | Stage 2 | | Total | Total | AT | Stage 2 |
| | | Area | Time | Area | Time | Area | Time | Prod. | Idleness |
| Original Design | a | t | 2a | t/2 | 3a | t | 3at | at |
| T/2 | T/2*¹ | a | t/2 | 2a | t/4 | 3a | t/2 | 3at/2 | at/2 |
| A/2 | A/2*² | a/2 | t | a | t/2 | 3a/2 | t | 3at/2 | at/2 |

TABLE 4-continued

| Methods | | | | | | | | |
|---|---|---|---|---|---|---|---|---|
| Stage 1 | Stage 2 | Stage 1 | | Stage 2 | | Total | Total | AT | Stage 2 |
| | | Area | Time | Area | Time | Area | Time | Prod. | Idleness |
| T/2 | A/2 | A | t/2 | a | t/2 | 2a | t/2 | at | 0 |
| A/2 | T/2 | a/2 | t | 2a | t/4 | 5a/2 | t | 5at/2 | 3at/2 |

*[1]the polyphase decomposition technique.
*[2]the coefficient folding technique.

Figure 10:
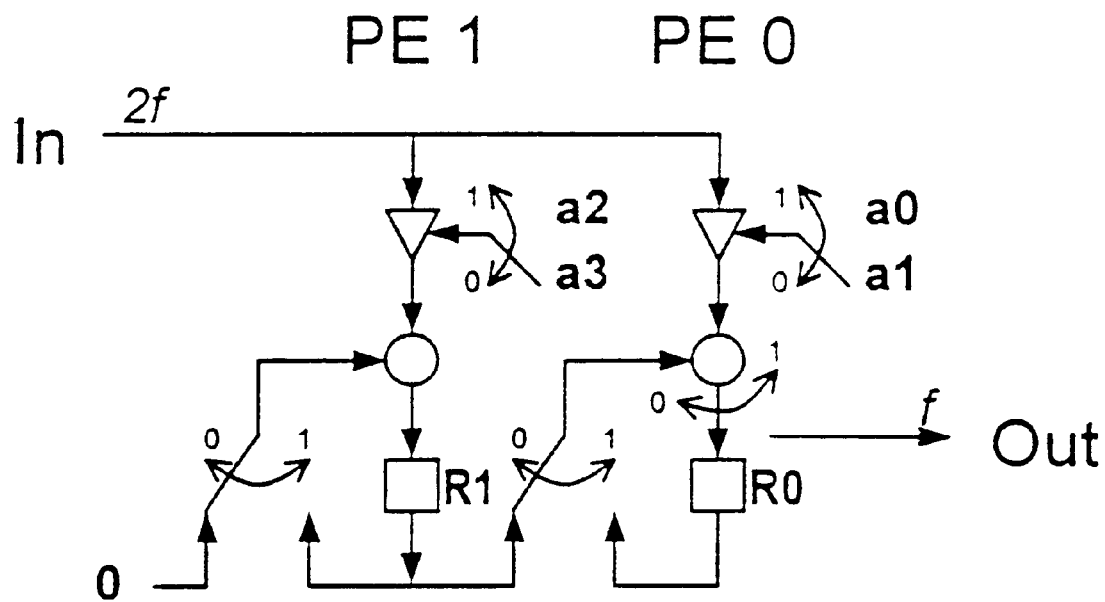
FIG. 10 is a schematic diagram illustrating the structure of the decimation filter after employing the coefficient folding technique according to the present invention.
Figure 11:
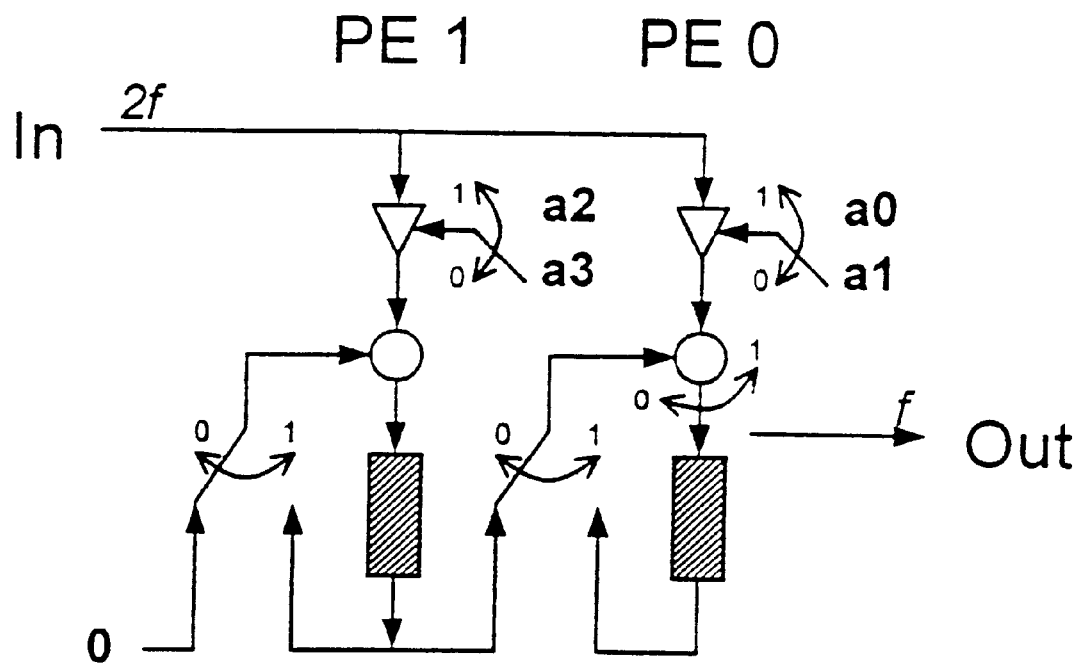
FIG. 11 is a schematic diagram illustrating the structure of the decimation filter of FIG. 10 in which the register shown in FIG. 10 is replaced by row register.

With respect to the decimation filters of the second stage, because the image data is fed to the decimation filters of the second stage by raster-scanning, a row register is required for every coefficient to store a row of image data so as to perform the vertical filtering operation. Accordingly, the register shown in FIG. 10 must be replaced by row register. Please refer to FIG. 11 which illustrates the structure of the decimation filter of FIG. 10 in which the register shown in FIG. 10 is replaced by row register, and its timing-data flow relationship is listed in Table 5.

TABLE 5

| Clk | SW | In | PE 1 | PE 0 | Out |
|---|---|---|---|---|---|
| 0 | 0 | x*(0) | $a_3$x*(0) | $a_1$x*(0) | |
| N | 1 | x*(1) | $a_2$x*(1) + $a_3$x*(0) | $a_0$x*(1) + $a_1$x*(0) | $a_0$x*(1) + $a_1$x*(0) |
| 2N | 0 | x*(2) | $a_3$x*(2) | $a_1$x*(2) + $a_2$x*(1) + $a_3$x*(0) | |
| 3N | 1 | x*(3) | $a_2$x*(3) + $a_3$x*(2) | $a_0$x*(3) + $a_1$x*(2) + $a_2$x*(1) + $a_3$x*(0) | $a_0$x*(3) + $a_1$x*(2) + $a_2$x*(1) + $a_3$x*(0) |
| 4N | 0 | x*(4) | $a_3$x*(4) | $a_1$x*(4) + $a_2$x*(3) + $a_3$x*(2) | |
| 5N | 1 | x*(5) | $a_2$x*(5) + $a_3$x*(4) | $a_0$x*(5) + $a_1$x*(4) + $a_2$x*(3) + $a_3$x*(2) | $a_0$x*(5) + $a_1$x*(4) + $a_2$x*(3) + $a_3$x*(2) |
| 6N | 0 | x*(6) | $a_3$x*(6) | $a_1$x*(6) + $a_2$x*(5) + $a_3$x*(4) | |
| 7N | 1 | x*(7) | $a_2$x*(7) + $a_3$x*(6) | $a_0$x*(7) + $a_1$x*(6) + $a_2$x*(5) + $a_3$x*(4) | $a_0$x*(7) + $a_1$x*(6) + $a_2$x*(5) + $a_3$x*(4) |
| 8N | 0 | x*(8) | $a_3$x*(8) | $a_1$x*(8) + $a_2$x*(7) + $a_3$x*(6) | |
| 9N | 1 | x*(9) | $a_2$x*(9) + $a_3$x*(8) | $a_0$x*(9) + $a_1$x*(8) + $a_2$x*(7) + $a_3$x*(6) | $a_0$x*(9) + $a_1$x*(8) + $a_2$x*(7) + $a_3$x*(6) |

Where x*(n) indicates the $n^{th}$ row data, SW indicates the directions of the switches, and N indicates the length of the row.

Figure 12:
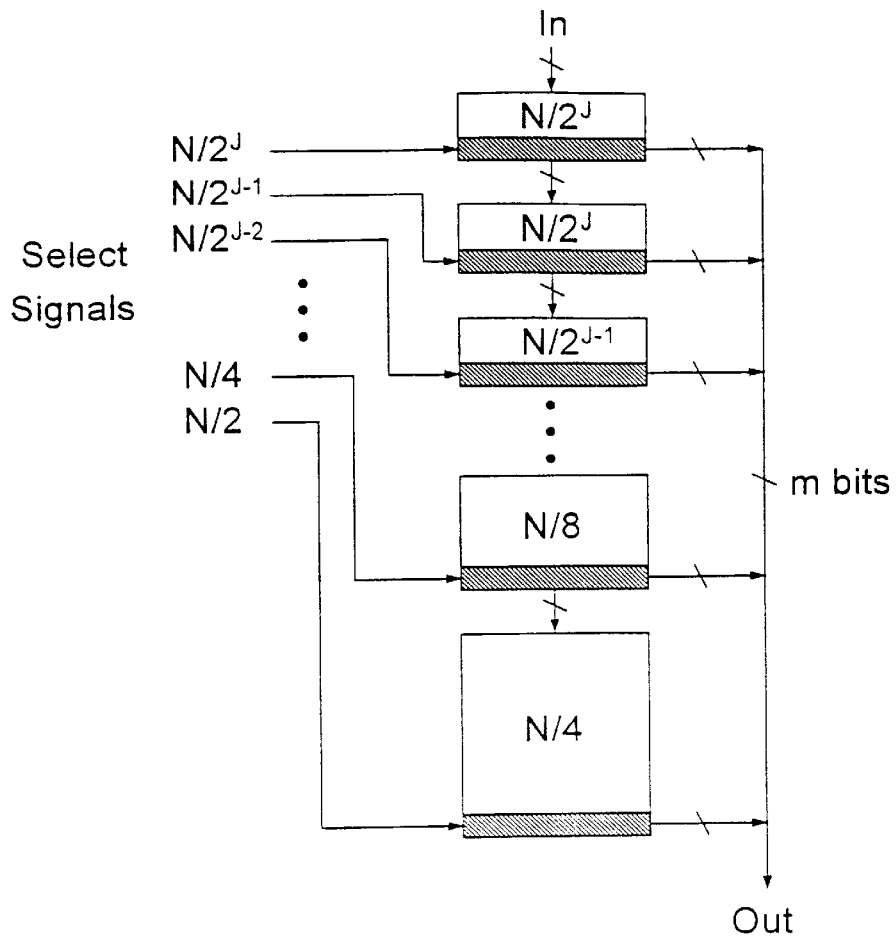
FIG. 12(A) is a schematic diagram showing the structure of the row register of FIG. 11.
FIG. 12(B) is a schematic diagram illustrating the one-by-two demultiplexer electrically connected between the row register of FIG. 11 and its input/output relationship.
Figure 12:
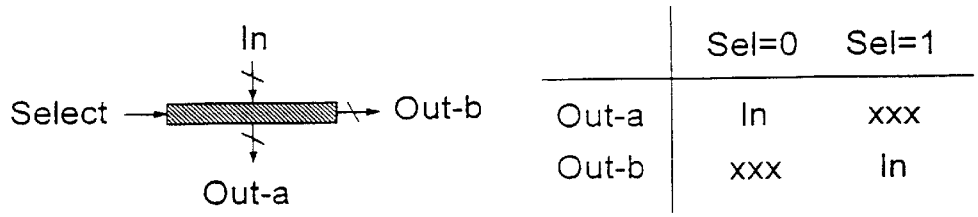

It can be seen from Table 5 that one row of image data will be outputted while two rows of image data are inputted. Please refer to FIG. 12(A) showing the structure of the row register of FIG. 11. The row register consists of J select signal lines of N/$2^J$, N/$2^{J-1}$, N/$2^{J-2}$, N/$2^{J-3}$, ..., N/8, N/4, N/2, and J register blocks having the size of N/$2^J$, N/$2^J$, N/$2^{J-1}$, N/$2^{J-2}$, ..., N/16, N/8, N/4 respectively, wherein J is the number of level. In different level decomposition, the relations between the select signals and the size of the row register is described as follows:

In the first level decomposition, the select signal N/2 will be enabled while the others will be disabled. The size of the row register will be the sum of the size of all the J register blocks:

$$\frac{N}{2^J} + \sum_{i=0}^{J-2} \frac{N}{2^{J-i}} = \frac{N}{2^J} + \frac{N}{2^J} + \frac{N}{2^{J-1}} + \frac{N}{2^{J-2}} + \dots + \frac{N}{16} + \frac{N}{8} + \frac{N}{4} + \frac{N}{2} \quad (14)$$

In the second level decomposition, the select signal N/4 will be enabled while the others will be disabled. The size of the row register will be the sum of the size of previous J−1 register blocks:

$$\frac{N}{2^J} + \sum_{i=0}^{J-3} \frac{N}{2^{J-i}} = \frac{N}{2^J} + \frac{N}{2^J} + \frac{N}{2^{J-1}} + \frac{N}{2^{J-2}} + \dots + \frac{N}{16} + \frac{N}{8} = \frac{N}{4} \quad (15)$$

In the third level decomposition, the select signal N/8 will be enabled while the others will be disabled. The size of the row register will be the sum of the size of previous J−2 register blocks:

$$\frac{N}{2^J} + \sum_{i=0}^{J-4} \frac{N}{2^{J-i}} = \frac{N}{2^J} + \frac{N}{2^J} + \frac{N}{2^{J-1}} + \frac{N}{2^{J-2}} + \dots + \frac{N}{16} = \frac{N}{8} \quad (16)$$

The rest level decomposition may be deduced by analogy. In the (J−2)$^{th}$ level decomposition, the select signal N/$2^{J-2}$ will be enabled while the others will be disabled. The size of the row register will be the sum of the size of previous 3 register blocks:

$$\frac{N}{2^J} + \sum_{i=0}^{1} \frac{N}{2^{J-i}} = \frac{N}{2^J} + \frac{N}{2^J} + \frac{N}{2^{J-1}} = \frac{N}{2^{J-2}} \quad (17)$$

In the (J−1)$^{th}$ level decomposition, the select signal N/$2^{J-1}$ will be enabled while the others will be disabled. The size of the row register will be the sum of the size of previous 2 register blocks:

$$\frac{N}{2^J} + \frac{N}{2^J} = \frac{N}{2^{J-1}} \quad (18)$$

In the J$^{th}$ level decomposition, the select signal N/$2^J$ will be enabled while the others will be disabled. The size of the row register will be the sum of the size of the first one register block: N/$2^J$. Therefore, in the first level decomposition, the size of the row register is N/2, which can be used to store a row of image data after performing horizontal filtering operation in the first stage. Subsequently, the size of the row register will be reduced to N/4 in the second level decomposition and the size of the row register will be reduced to N/8 in the third level decomposition. FIG. 12(B) illustrates the one-by-two demultiplexer electrically connected between the row register of FIG. 11 and its input/output relationship.

Figure 13:
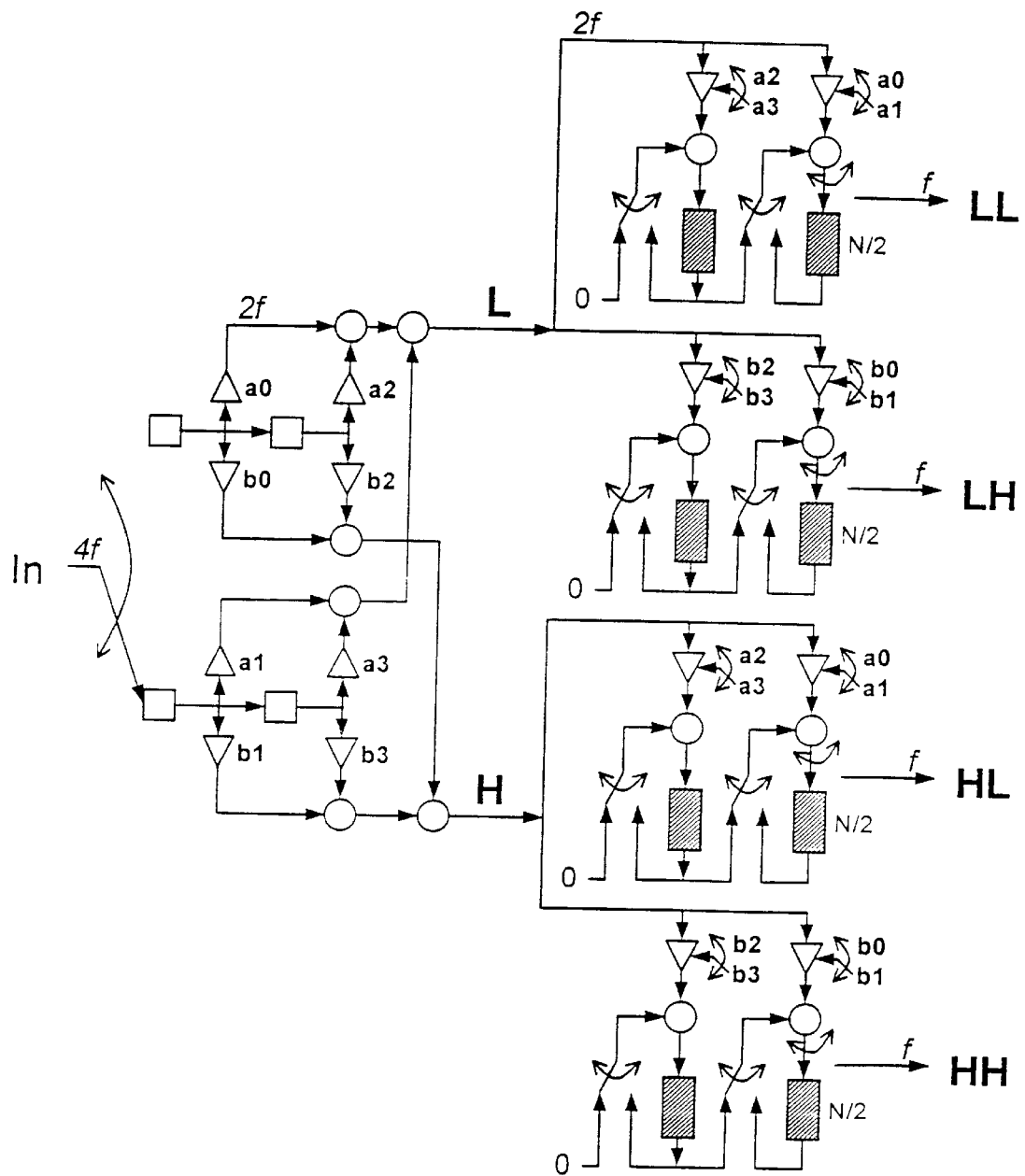
FIG. 13 is a schematic diagram illustrating the structure of the transform module of the architecture according to the present invention.
Figure 14:
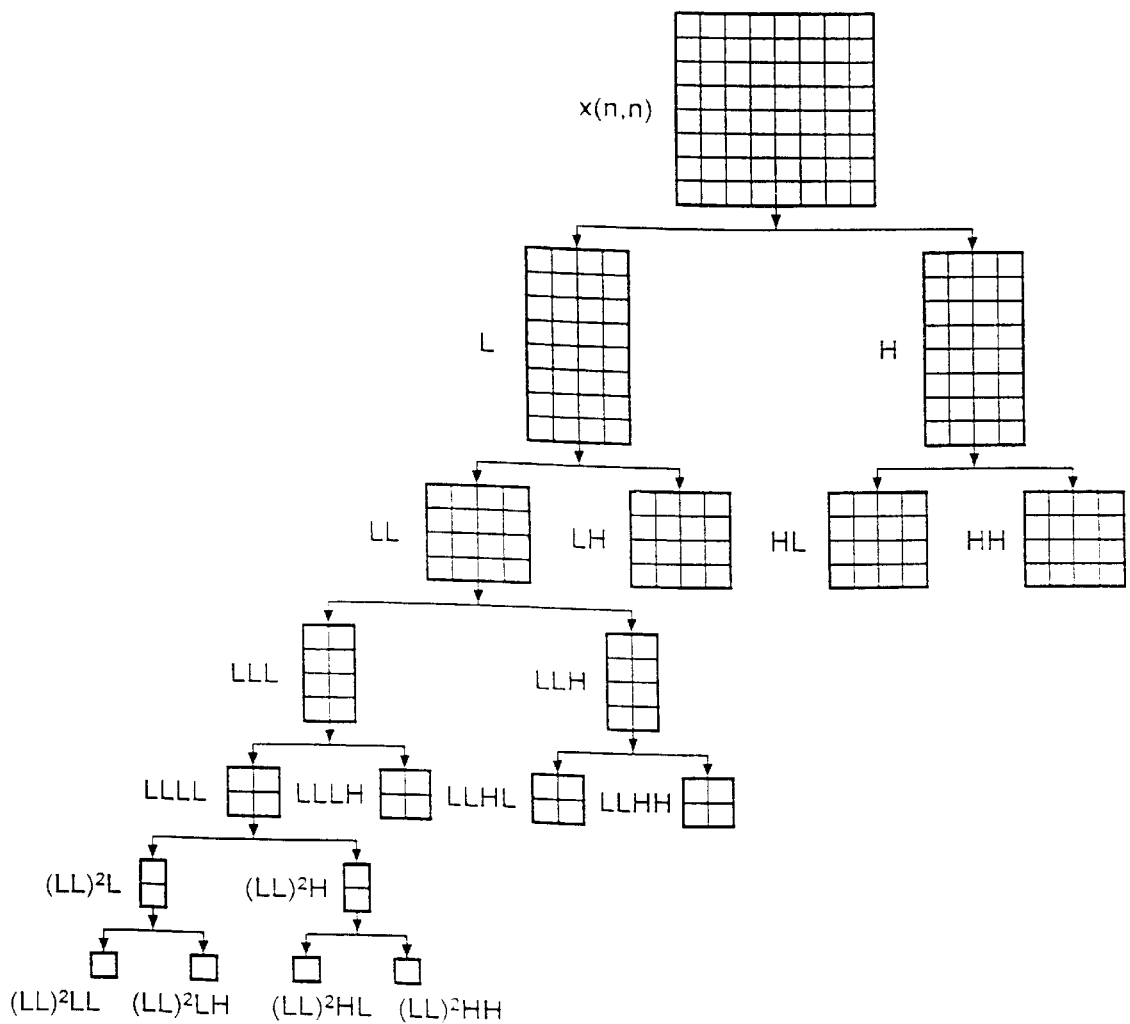
FIG. 14 is a schematic diagram illustrating the three-level architecture for the two-dimensional discrete wavelet transform according to the present invention.

Please refer to FIG. 13 illustrating the structure of the transform module according to the present invention. Assuming that the low-pass filter has four coefficients: a0, a1, a2, a4, and the high-pass filter has four coefficients: b0, b1, b2, b3. Because we use the FIR direct form to implement the polyphase decomposition technique, the low-pass filter and the high-pass filter in the first stage can share the same register. While we assume the filters in the first stage and the filters in the second stage have the same length, it may not be necessary to have the same length in practical applications. Also, because the polyphase decomposition technique is employed to the decimation filter of the first stage, the internal clock rate of the transform module is half of the input clock rate. FIG. 14 illustrates a three-level architecture for performing the two-dimensional discrete wavelet transform according to the present invention. The size of original image is 8×8, and the outputs will be four pixels all having the size of 1×1 through three level decomposition operation. Table 6 lists the timing-data flow relationship of the three-level architecture of FIG. 14. The clock cycle is based on the internal clock, and there are two input image data units in each clock cycle. The first level decomposition operation is performed during clock cycle 1 to 31, the second level decomposition operation is performed during clock cycle 32 to 39, and the third level decomposition operation is performed during clock cycle 40 to 41. Because the architecture of the present invention is regular, it can perform unlimited level decomposition operation without being limited by the coefficients of the filter.

TABLE 6

| Clk | In | L | H | LL | LH | HL | HH |
|---|---|---|---|---|---|---|---|
| 0 | x(0,0), x(0,1) | L(0,0) | H(0,0) | | | | |
| 1 | x(0,2), x(0,3) | L(0,1) | H(0,1) | | | | |
| 2 | x(0,4), x(0,5) | L(0,2) | H(0,2) | | | | |
| 3 | x(0,6), x(0,7) | L(0,3) | H(0,3) | | | | |
| 4 | x(1,0), x(1,1) | L(1,0) | H(1,0) | LL(0,0) | LH(0,0) | HL(0,0) | HH(0,0) |
| 5 | x(1,2), x(1,3) | L(1,1) | H(1,1) | LL(0,1) | LH(0,1) | HL(0,1) | HH(0,1) |
| 6 | x(1,4), x(1,5) | L(1,2) | H(1,2) | LL(0,2) | LH(0,2) | HL(0,2) | HH(0,2) |
| 7 | x(1,6), x(1,7) | L(1,3) | H(1,3) | LL(0,3) | LH(0,3) | HL(0,3) | HH(0,3) |
| 8 | x(2,0), x(2,1) | L(2,0) | H(2,0) | | | | |
| 9 | x(2,2), x(2,3) | L(2,1) | H(2,1) | | | | |
| 10 | x(2,4), x(2,5) | L(2,2) | H(2,2) | | | | |
| 11 | x(2,6), x(2,7) | L(2,3) | H(2,3) | | | | |
| 12 | x(3,0), x(3,1) | L(3,0) | H(3,0) | LL(1,0) | LH(1,0) | HL(1,0) | HH(1,0) |
| 13 | x(3,2), x(3,3) | L(3,1) | H(3,1) | LL(1,1) | LH(1,1) | HL(1,1) | HH(1,1) |
| 14 | x(3,4), x(3,5) | L(3,2) | H(3,2) | LL(1,2) | LH(1,2) | HL(1,2) | HH(1,2) |
| 15 | x(3,6), x(3,7) | L(3,3) | H(3,3) | LL(1,3) | LH(1,3) | HL(1,3) | HH(1,3) |
| 16 | x(4,0), x(4,1) | L(4,0) | H(4,0) | | | | |
| 17 | x(4,2), x(4,3) | L(4,1) | H(4,1) | | | | |
| 18 | x(4,4), x(4,5) | L(4,2) | H(4,2) | | | | |
| 19 | x(4,6), x(4,7) | L(4,3) | H(4,3) | | | | |
| 20 | x(5,0), x(5,1) | L(5,0) | H(5,0) | LL(2,0) | LH(2,0) | HL(2,0) | HH(2,0) |
| 21 | x(5,2), x(5,3) | L(5,1) | H(5,1) | LL(2,1) | LH(2,1) | HL(2,1) | HH(2,1) |
| 22 | x(5,4), x(5,5) | L(5,2) | H(5,2) | LL(2,2) | LH(2,2) | HL(2,2) | HH(2,2) |
| 23 | x(5,6), x(5,7) | L(5,3) | H(5,3) | LL(2,3) | LH(2,3) | HL(2,3) | HH(2,3) |
| 24 | x(6,0), x(6,1) | L(6,0) | H(6,0) | | | | |
| 25 | x(6,2), x(6,3) | L(6,1) | H(6,1) | | | | |
| 26 | x(6,4), x(6,5) | L(6,2) | H(6,2) | | | | |
| 27 | x(6,6), x(6,7) | L(6,3) | H(6,3) | | | | |
| 28 | x(7,0), x(7,1) | L(7,0) | H(7,0) | LL(3,0) | LH(3,0) | HL(3,0) | HH(3,0) |
| 29 | x(7,2), x(7,3) | L(7,1) | H(7,1) | LL(3,1) | LH(3,1) | HL(3,1) | HH(3,1) |
| 30 | x(7,4), x(7,5) | L(7,2) | H(7,2) | LL(3,2) | LH(3,2) | HL(3,2) | HH(3,2) |
| 31 | x(7,6), x(7,7) | L(7,3) | H(7,3) | LL(3,3) | LH(3,3) | HL(3,3) | HH(3,3) |
| 32 | LL(0,0), LL(0,1) | LLL(0,0) | LLH(0,0) | | | | |
| 33 | LL(0,2), LL(0,3) | LLL(0,1) | LLH(0,1) | | | | |
| 34 | LL(1,0), LL(1,1) | LLL(1,0) | LLH(1,0) | LLLL(0,0) | LLLH(0,0) | LLHL(0,0) | LLHH(0,0) |
| 35 | LL(1,2), LL(1,3) | LLL(1,1) | LLH(1,1) | LLLL(0,1) | LLLH(0,1) | LLHL(0,1) | LLHH(0,1) |
| 36 | LL(2,0), LL(2,1) | LLL(2,0) | LLH(2,0) | | | | |
| 37 | LL(2,2), LL(2,3) | LLL(2,1) | LLH(2,1) | | | | |
| 38 | LL(3,0), LL(3,1) | LLL(3,0) | LLH(3,0) | LLLL(1,0) | LLLH(1,0) | LLHL(1,0) | LLHH(1,0) |
| 39 | LL(3,2), LL(3,3) | LLL(3,1) | LLH(3,1) | LLLL(1,1) | LLLH(1,1) | LLHL(1,1) | LLHH(1,1) |
| 40 | LLLL(0,0), LLLL(0,1) | $(LL)^2L(0,0)$ | $(LL)^2H(0,0)$ | | | | |
| 41 | LLLL(1,0), LLLL(1,1) | $(LL)^2L(1,0)$ | $(LL)^2H(1,0)$ | $(LL)^2LL(0,0)$ | $(LL)^2LH(0,0)$ | $(LL)^2HL(0,0)$ | $(LL)^2HH(0,0)$ |

Currently, the representative architectures for performing the two-dimensional discrete wavelet transform are: parallel filter architecture, direct architecture, non-separable architecture, SIMD architecture, and systolic-parallel architecture. The performance of the architecture according to the present invention will be compared with the aforementioned architectures in terms of the number of multipliers, the number of adders, storage size, computing time, control complexity, and hardware utilization. The result of comparison is listed in Table 7:

TABLE 7

| Architectures | Multipliers | Adders | Storage Size | Computing Time | Control Complexity | Hardware Utilization |
|---|---|---|---|---|---|---|
| The present invention | 4K | 4K | $N^2/4 + KN + K$ | $0.5N^2 \sim 0.67N^2$ | Simple | 100% |
| Parallel Filter | 4K | 4K | $2KN + N$ | $N^2$ | Complex | Low |
| Direct | K | K | $N^2$ | $4N^2$ | Complex | Low |
| Non-Separable | $2K^2$ | $2(K^2 - 1)$ | $2KN$ | $N^2$ | Complex | High |
| SIMD | $2N^2$ | $2N^2$ | $N^2$ | $K^2J$ | Complex | Low |
| Systolic-Parallel | 4K | 4K | $2KN + 4N$ | $N^2$ | Complex | Low |

Where the computing time has been adjusted to the same with the internal clock rate, and the unit of computing time is clock cycle. The parameter K is the filter length, $N^2$ is the size of the original image, J is the number of level. The computing time of the architecture according to the present invention would be evaluated as follows:

$$T = \frac{1}{2}\sum_{L=1}^{J} \frac{N^2}{4^{L-1}} = \frac{1}{2}\left(N^2 + \frac{N^2}{4} + \frac{N^2}{4^2} + \frac{N^2}{4^3} + \ldots + \frac{N^2}{4^{J-1}}\right) = \frac{2}{3}(1 - 4^{-J})N^2 \quad (19)$$

where the factor ½ adopted in Eq. (19) indicates that the internal clock rate of the architecture according to the present invention is half of the input clock rate. Accordingly, if the internal clock rate of the architecture according to the present invention is identical to that of other architectures, the throughput of the architecture according to the present invention will be twice of that of the other architectures and the computing time will thus be reduced. It can be seen from Table 7 that the architecture of the present invention is apparently superior to the other architectures in terms of computing time, control complexity, and hardware utilization.

Besides, a comparison is made to compare the architecture of the present invention with the well-known parallel filter architecture in terms of computing time and hardware utilization. As described above, the design of the parallel filter architecture is based on the MRPA to dispersively interpolate the computations of the second and the subsequent levels in the computation of the first level. Table 8 lists the result of comparison:

TABLE 8

| 2-D DWT Levels | Computing Time | | Hardware Utilization | |
|---|---|---|---|---|
| | The present invention | Parallel | The present invention | Parallel |
| 1 | $0.5N^2$ | $N^2$ | 100% | 50% |
| 2 | $0.63N^2$ | $N^2$ | 100% | 62.5% |
| 3 | $0.66N^2$ | $N^2$ | 100% | 65.63% |
| 4 | $0.66N^2$ | $N^2$ | 100% | 66.41% |
| 5 | $0.67N^2$ | $N^2$ | 100% | 66.60% |
| 6 | $0.67N^2$ | $N^2$ | 100% | 66.65% |
| 7 | $0.67N^2$ | $N^2$ | 100% | 66.66% |
| 8 | $0.67N^2$ | $N^2$ | 100% | 66.67% |

Where $N^2$ is the size of original image.

Figure 15:
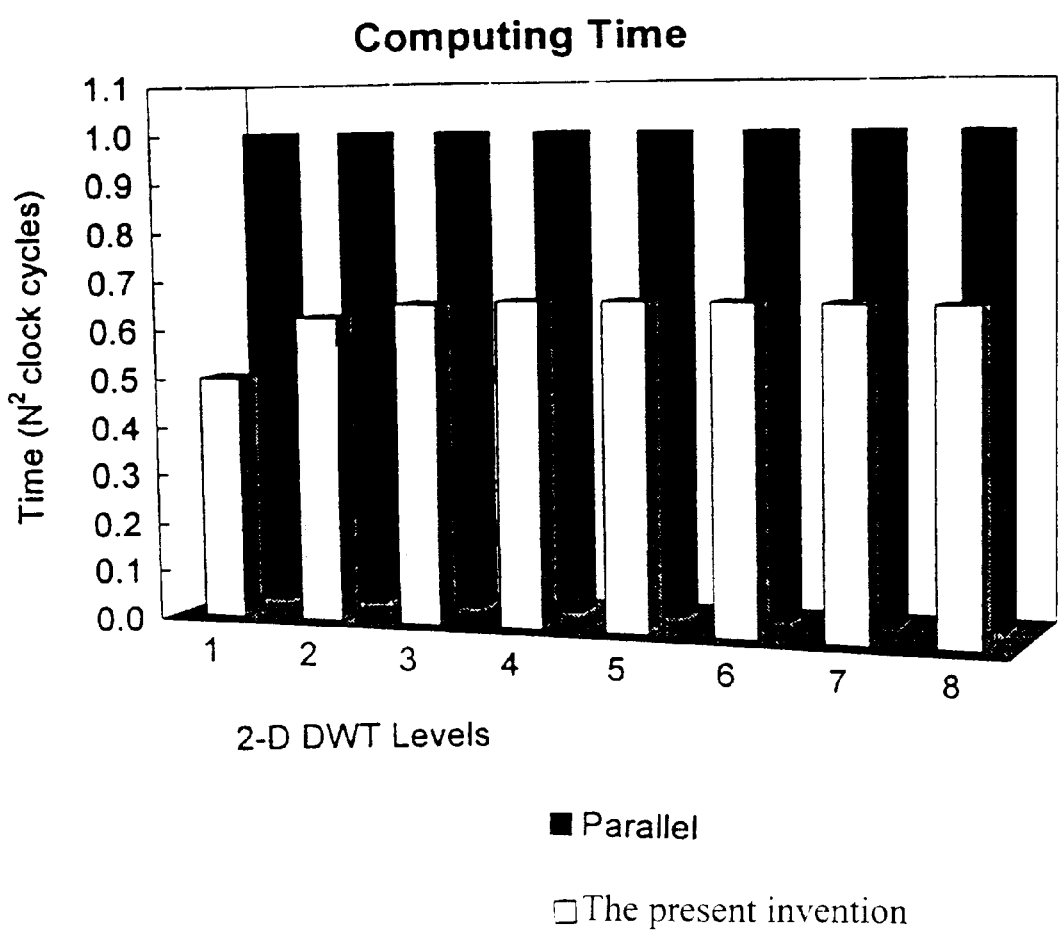
FIG. 15 is a plot showing the computing time of the conventional parallel filter architecture and the architecture of the present invention.
Figure 16:
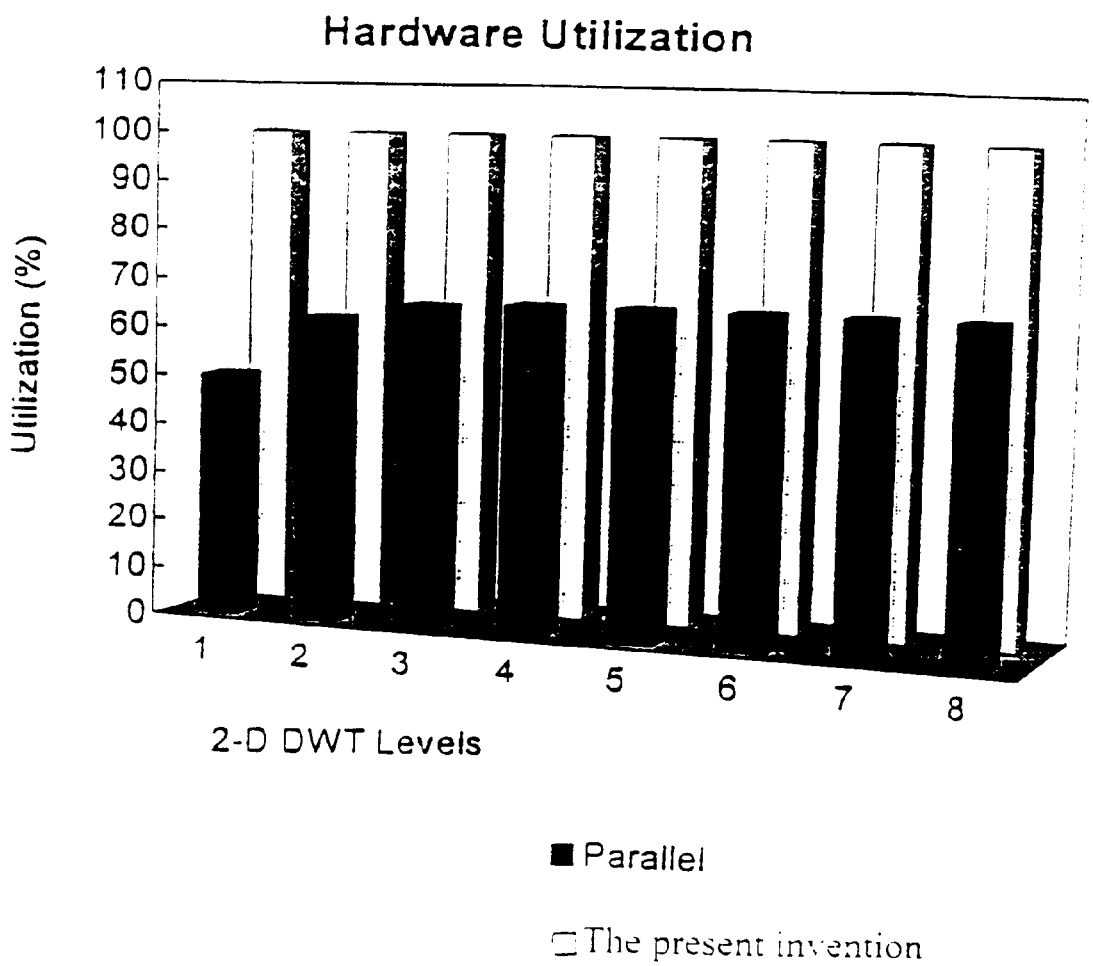
FIG. 16 is a plot showing the hardware utilization of the conventional parallel filter architecture and the architecture of the present invention.

Please refer to FIG. 15 showing the computing time of the parallel filter architecture and the architecture of the present invention. It can be found that the decomposition level is one (J=1), the computing time of the architecture according to the present invention will be $$\frac{2}{3}(1 - 4^{-1}) = 0.5N^2$$

clock cycles. As the increase of decomposition level (J>4), the computing time according to the present invention will be converged to $$\frac{2}{3}(1 - 4^{-5})N^2 \approx 0.67N^2$$

clock cycles. However, the computing time of the parallel filter architecture will always be $N^2$ clock cycles. On the other hand, FIG. 16 shows the hardware utilization of the parallel filter architecture and the architecture of the present invention. It can be found that while the decomposition level is one (J=1), the hardware utilization of the parallel filter architecture will be only 50%. As the increase of decomposition levels (J>4), the hardware utilization will be converged to 66.67%. However, the hardware utilization of the architecture according to the present invention will be maintained at 100%.

With regard to the requirement of storage size of the optional memory module, a memory module having a size of N/2×N/2 is needed to store the intermediate data derived in the decomposition operation. However, if the architecture of the present invention is applied in an image compression system of a practical application such as a digital camera, it can use the memory already existing in the image compression system to store the intermediate data. Hence, the architecture of the present invention will not require the memory module any longer and the value of $N^2/4$ listed in Table 7 can be discarded.

In order to achieve real-time processing, a variety of architectures for performing the two-dimensional discrete wavelet transform are proposed at the present time. However, the low hardware utilization and long computing time are the major drawbacks for these architectures. However, the architecture of the present invention overcomes the foregoing drawbacks and has been correctly verified by the Verilog hardware description language to prove that it is the most efficient architecture for performing the two-dimensional discrete wavelet transform.

According to the above statements, the architecture of the present invention is characterized by 100% hardware utilization, short computing time, regular data flow, and low control complexity such that the architecture of the present invention is adapted to the image compression standard of new generation, e.g. JPEG-2000 or MEPG-4 image compression standards.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. An architecture adapted to performing the two-dimensional discrete wavelet transform for performing a multilevel decomposition operation to decompose an original image into a plurality of bands, comprising:
   a transform module for decomposing an input image into four bands, wherein among said four bands, a band having a low frequency in both horizontal and vertical directions serves as an input image for a next level decomposition operation, said transform module further comprising:
      a first stage having decimation filters for performing a horizontal filtering operation; and
      a second stage having decimation filters for performing a vertical filtering operation, wherein a coefficient folding technique is employed by said decimation filters of said second stage such that every two coefficients of said decimation filters of said second stage share one set of a multiplier, and adder and a register; and
   a multiplexer for selecting said band having the lowest frequency in both horizontal and vertical direction as the input image to feed into said transform module.

2. An architecture according to claim 1 wherein said architecture further includes a memory module for storing said band having the low frequency in both horizontal and vertical direction.

3. An architecture according to claim 2 wherein the storage size of said memory module is one-fourth of the size of said original image.

4. An architecture according to claim 1 wherein the polyphase decomposition technique is employed to said decimation filters of said first stage for segmenting the coefficients of said decimation filters of said first stage into an odd-numbered part and an even-numbered part.

5. An architecture according to claim 1 wherein said register is a row register including:
   multiple register blocks, wherein the number of said register blocks is the number of decomposition level of said architecture;
   multiple one-by-two demultiplexer, each of which is electrically connected between two said register blocks for receiving the output of the previous register block as an input, wherein one output of each one of said one-by-two demultiplexer serves as the input for next register block and the other output of each one of said one-by-two demultiplexer serves as a part of the output of said row register; and
   multiple select signal lines, each of which is electrically connected to one said corresponding one-by-two demultiplexer for selecting the output of said corresponding one-by-two demultiplexer.

6. An architecture adapted to perform the two-dimensional discrete wavelet transform for performing a single level decomposition operation to decompose an original image into four bands, comprising:
   a transform module for decomposing said original image into four bands, wherein said transform module further comprises:
      a first stage having decimation filters for performing the horizontal filtering operation; and
      a second stage having decimation filters for performing the vertical filtering operation, wherein the coefficient folding technique is employed to said decimation filters of said second stage such that every two coefficients of said decimation filters of said second stage share one set of a multiplier, an adder and a register.

7. An architecture according to claim 6, wherein the polyphase decomposition technique is employed to said decimation filters of said first stage for segmenting the coefficients of said decimation filters of said first stage into an odd-numbered part and an even-numbered part.

* * * * *